US008180710B2

(12) United States Patent
Strichman et al.

(10) Patent No.: US 8,180,710 B2
(45) Date of Patent: May 15, 2012

(54) SYSTEM, METHOD AND COMPUTER PROGRAM PRODUCT FOR AN INTERACTIVE BUSINESS SERVICES PRICE DETERMINATION AND/OR COMPARISON MODEL

(76) Inventors: Adam J. Strichman, Mechanicsville, VA (US); Christopher Pattacini, Manchester, CT (US); Kent Christian, Falls Church, VA (US)

(*) Notice: Subject to any disclaimer, the term of this patent is extended or adjusted under 35 U.S.C. 154(b) by 1067 days.

(21) Appl. No.: 11/860,699

(22) Filed: Sep. 25, 2007

(65) Prior Publication Data

US 2009/0083120 A1    Mar. 26, 2009

(51) Int. Cl.
*G06F 17/00* (2006.01)
*G06Q 40/00* (2012.01)
(52) U.S. Cl. .......................... 705/400; 705/7.11; 705/35
(58) Field of Classification Search ............... 705/7, 10, 705/400, 1.1, 7.11, 7.28–7.41, 28–30, 32, 705/35, 347, 348; 703/2
See application file for complete search history.

(56) References Cited

U.S. PATENT DOCUMENTS

| | | | | | |
|---|---|---|---|---|---|
| 6,058,369 | A | * | 5/2000 | Rothstein ........................ | 705/10 |
| 6,941,287 | B1 | * | 9/2005 | Vaidyanathan et al. ........ | 706/12 |
| 7,509,261 | B1 | * | 3/2009 | McManus et al. ............ | 705/313 |
| 7,613,626 | B1 | * | 11/2009 | Muniganti et al. ........... | 705/7.35 |
| 7,698,193 | B2 | * | 4/2010 | Davin et al. .................. | 705/36 R |
| 7,729,971 | B2 | * | 6/2010 | Williamson et al. ......... | 705/36 R |
| 7,769,653 | B2 | * | 8/2010 | Rousseau et al. ............... | 705/35 |
| 7,899,725 | B2 | * | 3/2011 | Ballow et al. ................... | 705/35 |
| 2002/0016758 | A1 | * | 2/2002 | Grigsby ......................... | 705/36 |
| 2003/0074329 | A1 | * | 4/2003 | Jandasek et al. ................ | 705/80 |
| 2004/0049470 | A1 | * | 3/2004 | Ouimet ......................... | 705/400 |
| 2007/0083452 | A1 | * | 4/2007 | Mayle et al. ................. | 705/36 R |
| 2007/0282671 | A1 | * | 12/2007 | Athey et al. .................... | 705/10 |

* cited by examiner

*Primary Examiner* — Igor Borissov
(74) *Attorney, Agent, or Firm* — Latimer IP Law, LLC

(57) ABSTRACT

A system, method, and computer program product are disclosed for determining a standard market pricing index for pricing user-defined business services and for comparing unique configurations of business services to the determined market pricing index and/or to other unique configurations of business services. Portions of the disclosed system, method, and/or computer program product describe a model and user interface for performing standard, objective, repeatable, and directly comparable benchmarking of business services. In general, the computerized model compiles a set of market price data and interprets specific configurations and characteristics from the market data set. The model performs a periodic analysis to determine which configurations and/or characteristics are the most common within the data set, yielding a common market configuration. The model further performs an iterative process in which all the data within the data set is normalized and adjusted to the common market configuration of similar business services. A user enters a user-defined services data set into the model, in the form of answers to questions through a user-interface, and upon running the model, receives a report indicating a likely market price for such services.

21 Claims, 9 Drawing Sheets

400

| REPORT DETAILS | |
|---|---|
| Your Name | Your Name |
| Report Name | Your Company |
| Run Date | 10-Aug-2007, 04:08:12 PM |
| MAINFRAME SERVICES | |
| Operations | YES |
| Security | YES |
| Data Center Print included? | NO |
| MicroFiche/Film included? | NO |
| Network Support included? | NO |
| Technical Support | YES |
| Database Administration (DBA) | Basic DBA Supp |
| Service Level Management (SLA metrics collection and analysis) | YES |
| Maintenance (equipment and software) | YES |
| DR Recovery Objective 1(if Hot Site is included) | Recovery Time Require Hot Site 48 hr recov |
| Percent of Environment Covered (pct) 60 | |
| SERVICE LEVELS & PERFORMANCE | |
| Mainframe Availability SLA - Hardware/OS (percent) | <99.50% |
| Availability Window (hours per week) | 7x24 |
| Response Time SLA | 85% less than 2 sec |

- 410 (Report Details section)
- 420 (Mainframe Services section)
- 430 (Service Levels & Performance section)

| HARDWARE OWNERSHIP | |
|---|---|
| Mainframe Equipment | Vendor |
| Storage Equipment (DASD) | Vendor |
| Tape Equipment | Vendor |

⎱ 440

| PERFORMANCE BASELINE & PRICES | | |
|---|---|---|
| Installed MIPS | | 2000 |
| GB of Online Storage | Installed 10000 | 5000 |
| Tape | TB Stored on Tape | 100 |
| | Tape Mounts per Month | 125000 |
| | (% mounts that are Manual (if known) | 35 |
| | Tapes Stored ON SITE | 20000 |
| | Tapes Stored OFF SITE | 40000 |

⎱ 450

| COMPLEXITY - WORKLOAD AND LOCATION | | |
|---|---|---|
| CPU | Batch as pct. of total | <30% |
| | Number of LPARS | 5 |
| Equipment Location | % of workload in vendor facility (pct) | 100 |
| | % of hardware located off shore (pct) | 0 |
| | Number of data center locations | 1 |
| | % of workload in metro area (pct) | 100 |
| | % of delivery FTE off shore (pct) | <10% |

⎱ 460

[Run Report]  [Reset Form]

SYSTEM, METHOD AND COMPUTER PROGRAM PRODUCT FOR AN INTERACTIVE BUSINESS SERVICES PRICE DETERMINATION AND/OR COMPARISON MODEL

BACKGROUND OF THE INVENTION

1. Field of the Invention

The present invention pertains generally to determining a contract price for a user-defined configuration of business services. More specifically, the present invention relates to comparing normalized configurations of business services to a corresponding normalized market standard and/or other business services.

2. Discussion of Related Art

Benchmarking is the process of comparing something against a defined standard in order to gain some knowledge about that thing, such as price, etc. In some cases, the price benchmarking process is somewhat analogous to the process of appraising the market price of a house. For example, house prices are typically estimated based on descriptive characteristics such as size (e.g., in units of square feet), location, number of bedrooms, market factors, and so forth. By obtaining many such characteristics, a fairly accurate representation of the house, or target property, may be determined. The target property is then compared to a set of similar properties that have recently sold to determine the market value. Because properties rarely have identical characteristics, adjustments must first be made to account for differences. At that point, a comparison can be made and fair market price assessed. Similarly, the fair market prices of service contracts are often determined by making comparisons to the closest "peers" after appropriate adjustments have been made to account for differences as best as possible.

In many cases, a client and business service provider jointly select and compensate a third party firm to conduct a benchmark for particular services. However, because service contracts often comprise many unique characteristics and the fact that there are different benchmarking methodologies available, the results are typically subjective and vary from benchmark to benchmark. Indeed each benchmarking firm uses a different approach, and even within a particular firm, when benchmarking is performed by consultants, the results vary even further because it is difficult to remove all bias from the individual.

Currently there exists a need in the art for a benchmarking process that can determine a market price for user-defined business services in a standard, objective, interactive, repeatable, and cost effective manner.

SUMMARY OF THE INVENTION

The present invention addresses current needs and provides a system, method, and computer program product for determining a standard market pricing index for pricing user-defined business services and for comparing unique configurations of business services to the determined market pricing index and/or to other unique configurations of business services.

According to a first aspect, a method is disclosed for determining a contract price for a user-defined configuration of business services, the method comprising: obtaining a plurality of raw data sets of existing characteristic market service data, wherein at least some of the characteristic data includes pricing data; deriving industry standard values for market services using the market raw data sets and/or other external data; normalizing and adjusting the market raw data sets with respect to the derived industry standard values; calculating and/or plotting an industry pricing index using the normalized market data sets; obtaining characteristic data for a user-defined configuration of business services; normalizing and adjusting the user-defined characteristic data set with respect to corresponding derived industry standard values; determining a contract price for the user-defined configuration of business services using at least some of the normalized and adjusted user-defined characteristic data and/or normalized and adjusted market data; and generating one or more reports that graphically display the calculated and/or determined results. In a further embodiment, the step of obtaining the user-defined characteristic data set includes obtaining characteristic data that does not include a contract price, and the determining step includes determining a corresponding contract price based on the industry pricing index. In a further embodiment, the step of obtaining the user-defined characteristic data set includes obtaining characteristic data that includes a proposed (or actual) contract price, and the determining step further includes directly comparing a normalized and adjusted proposed price to the industry pricing index, thereby determining a price difference between the normalized and adjusted proposed contract price and a market average.

According to a second aspect, a system is disclosed for determining a contract price for a user-defined configuration of business services, the system including: a user interface module configured to obtain characteristic data sets for a user-defined configuration of business services; a database module configured to obtain and store a plurality of raw data sets of existing market service characteristic data, wherein at least some of the characteristic data includes pricing data; an industry standard module configured to derive industry standard values for characteristic market services using the raw data sets; a normalization module configured to normalize and adjust user-defined and market raw data sets with respect to the derived industry standard values; an industry pricing module configured to calculate an industry pricing index using the adjusted market data sets; a price determining module configured to calculate a contract price for the user-defined configuration of business services using at least some of the normalized and adjusted user-defined characteristic data and/or normalized and adjusted market data; and a report generating module configured to generate one or more reports that graphically display the calculated and/or determined results. In embodiments, the user interface module is configured to receive characteristic data that does not include a contract price, and the price determining module is configured to determine a corresponding contract price based on the industry pricing index. In embodiments, the user interface module is configured to receive characteristic data that includes a proposed (or actual) contract price, the normalization module is configured to normalize and adjust the proposed price, and the system further includes a comparison module configured to directly compare the normalized and adjusted proposed price to the industry pricing index, thereby determining a price difference between the normalized and adjusted proposed price and a market average.

According to a third aspect, a computer program product is disclosed for determining a contract price for a user-defined configuration of business services, the computer program product including computer-readable instructions for: obtaining a plurality of raw data sets of existing characteristic market service data, wherein at least some of the characteristic data includes pricing data; deriving industry standard values for the characteristic market services using the market raw data sets; normalizing and adjusting the market raw data sets with respect to the derived industry standard values; calculating an industry pricing index using the normalized and adjusted market data sets; obtaining characteristic data for a user-defined configuration of business services; determining a contract price for the user-defined configuration of business services using at least some of the normalized and adjusted user-defined characteristic data and/or normalized and adjusted market data; and generating one or more reports that graphically display the calculated and/or determined results. In a further embodiment, the instructions for obtaining characteristic data for a user-defined configuration of business services include instructions for obtaining characteristic data that does not include a contract price, and the instructions for determining a contract price include instructions for determining a corresponding contract price based on the industry pricing index. In a further embodiment, the instructions for obtaining characteristic data for a user-defined configuration of business services include instructions for obtaining a proposed (or actual) contract price, and the instructions for determining a contract price further include directly comparing a normalized and adjusted proposed contract price to the industry pricing index, thereby determining a price difference between the normalized and adjusted proposed price and a market average.

At least portions of the disclosed system, method, and/or computer program product describe a model for performing standard, objective, repeatable, and directly comparable benchmarking of business services.

At least portions of the disclosed system, method, and/or computer program product describe an interactive user interface allowing a user to enter user-defined configuration(s) of business services and to obtain one or more benchmark results in a consistent, repeatable, and comparable manner.

BRIEF DESCRIPTION OF THE DRAWINGS

FIGS. 4 *a* and *b* illustrate user interface views according to an exemplary embodiment of the invention.

DETAILED DESCRIPTION OF PREFERRED EMBODIMENTS

Reference will now be made in detail to various exemplary embodiments of the invention. The following detailed description is provided to better illustrate certain details of aspects of the preferred embodiments, and should not be interpreted as a limitation on the scope or content of the invention. In general, the present disclosure describes a system, method, and computer program product for determining a standard market pricing index for pricing user-defined business services and for comparing unique configurations of business services to the determined market pricing index and/or to other unique configurations of business services. The principles disclosed herein may be used to support business cases for outsourcing, using in-house resources, re-sourcing of existing contracts, obtaining independent third party assessments, and/or other uses where an understanding of market pricing, packaging, and/or configuration of services is useful. Moreover, it is understood that the principles disclosed herein are also applicable to: quantifying costs associated with the purchase and/or delivery of existing and planned business services; estimating the costs associated with a merger, acquisition, or expansion of an existing enterprise; allowing business service providers to determine correct market pricing of their suite of service offerings, and more. Although business services are used herein by way of example, it will further be appreciated that benchmarking of other services and/or products will be deemed to fall within the spirit and scope of the present invention.

At a high level, one aspect of the invention provides a computerized model that compiles a set of market price data and interprets specific configurations and characteristics from the data set. The model performs a periodic analysis to determine which configurations and/or characteristics are the most common within the data set, yielding a common market configuration. The model further performs an iterative process in which all the data within the data set are normalized and adjusted to the common market configuration of similar business services. A user enters a user-defined data set into the model, (e.g., in the form of answers to questions) through a user-interface, and upon running the model, receives a report indicating a likely market price for such services.

Method

Figure 1A:
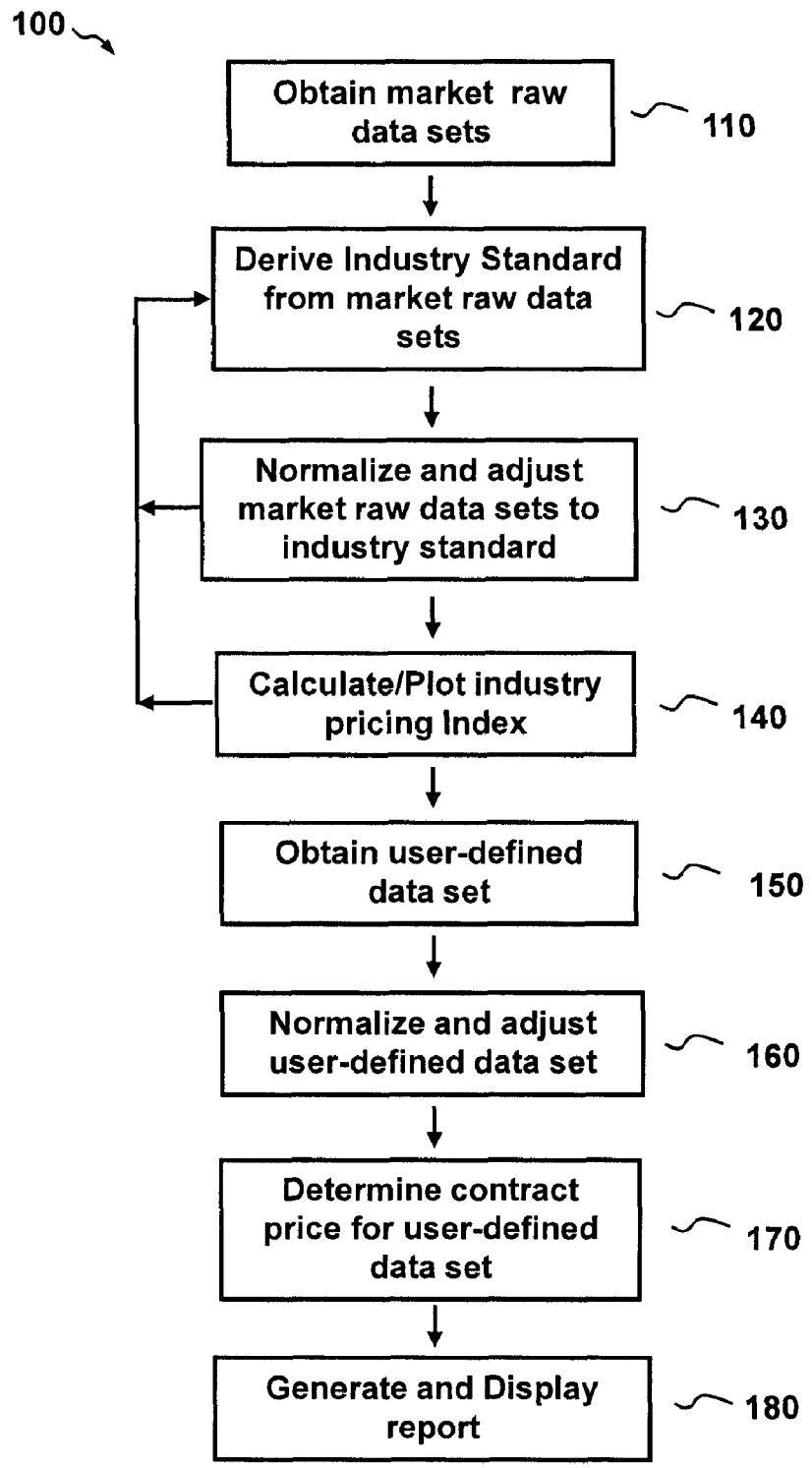
FIGS. 1 *a-c* illustrate business service pricing and/or comparison method steps according to exemplary embodiments of the invention.

FIG. 1*a* illustrates exemplary method steps (shown generally at 100) that may be implemented as part of a business services pricing model. The method steps of the pricing model may be implemented in whole, or in part, using appropriately configured spreadsheet, database, and/or other software tools as will be appreciated by those skilled in the art. In addition, it is further possible that the illustrated or discussed method steps may be performed in different sequences and are not limited to the order presented.

In step 110, a plurality of market raw data sets are obtained and stored in one or more databases (not shown). A "market raw data set" refers to a configuration (or suite) of business offerings for a prior or existing service contract. The market raw data sets are typically described in terms of characteristic information such as type, quantity, quality, complexity, etc. and may further describe hardware requirements, software requirements, third-party service requirements, and so forth. As used herein, raw data set(s) refer to data set(s) that have not yet been normalized or adjusted according to the principles of the present disclosure.

According to preferred embodiments, the market raw data sets are collected from various sources and stored in the database(s). Such sources of market raw data include, but are not necessarily limited to: previous or existing business contracts, sources of public data, and/or vendors of business services data. Publicly available contract information may be obtained from state or local websites, trade organizations, and a variety of other sources. For example, some state websites provide publicly available government contract information as well as contract-relevant information such as current legislation, technical updates, and more. In some embodiments, the information in the raw data sets and/or external information may be used to construct a detailed configuration of the business service being modeled. External information may include, for example, pricing drivers, costing ratios, and the like. In further embodiments, the market price data is compiled and analyzed to determine which configurations and characteristics are the most common within the data set, yielding a common market configuration.

According to the principles disclosed herein, the one or more databases may be used to sort and/or process the raw data sets according to various characteristics. Characteristics may include, but are not limited to: pricing, service volume, labor resources, hardware resources, type of service, third party services, quantity of service, quality of service, complexity of service, etc. Additionally and/or alternatively, the data may be sorted based on categorical values (e.g., region, industry, objectives, etc.), scalar values (e.g., price, quantity, etc.), as well as various other groupings as will be appreciated by those skilled in the art. The raw market data may be initially sorted and/or grouped using commercially available spreadsheet and/or database tools.

However, even with the use of standard spreadsheet and/or database tools, the raw market data sets still typically comprise significantly different characteristics and price points that exhibit very little, or no means for direct comparison. Thus, preferred embodiments of the present invention provide for an iteratively derived industry standard of market services, which may be plotted in the form of a market pricing index. In addition, unlike conventional benchmarking processes, which perform comparisons between a few of the closest "peer" contracts, preferred embodiments of the present invention perform direct comparisons with respect to an industry-wide standard.

Referring again to FIG. 1a, in step 120, the industry standard is iteratively derived from the raw market data sets e.g., for a particular industry. According to preferred embodiments, the iterative process is formed by steps 120, 130, and 140, which collectively and simultaneously determine the market standard data set while calculating (and/or plotting) a price curve in terms of price versus contract volume, for example. In embodiments, the price curve may be created using a curve-fit algorithm appropriate for the data being modeled. Exemplary curve-fit algorithms may include a mathematical power curve, trend function and/or forecasting function, and the like. In step 130, the market raw data sets are normalized and adjusted with respect to the derived industry standard. According to embodiments, the market data sets in step 130 are normalized with respect to several service characteristics. In some cases, the number of service characteristics may be 15, or more, however fewer characteristics may be used. In further embodiments, the adjustment percentages in step 130 are based upon the market data sets and/or from external data regarding e.g., known costing ratios. Preferably, such normalizations and adjustments are iteratively applied to the price curve, resulting in a new price curve, and the procedure repeated until the price curve remains within a pre-determined tolerance level following successive iterations. In embodiments, the pre-determined tolerance is less than about 1%, such as 0.8%, 0.75%, 0.5%, 0.25%, 0.2%, 0.1%, or less. The obtained pricing curve may then be plotted to represent price versus contract volume of market data sets that have been adjusted to have the same exact characteristics.

Iterative Process

Figure 1B:
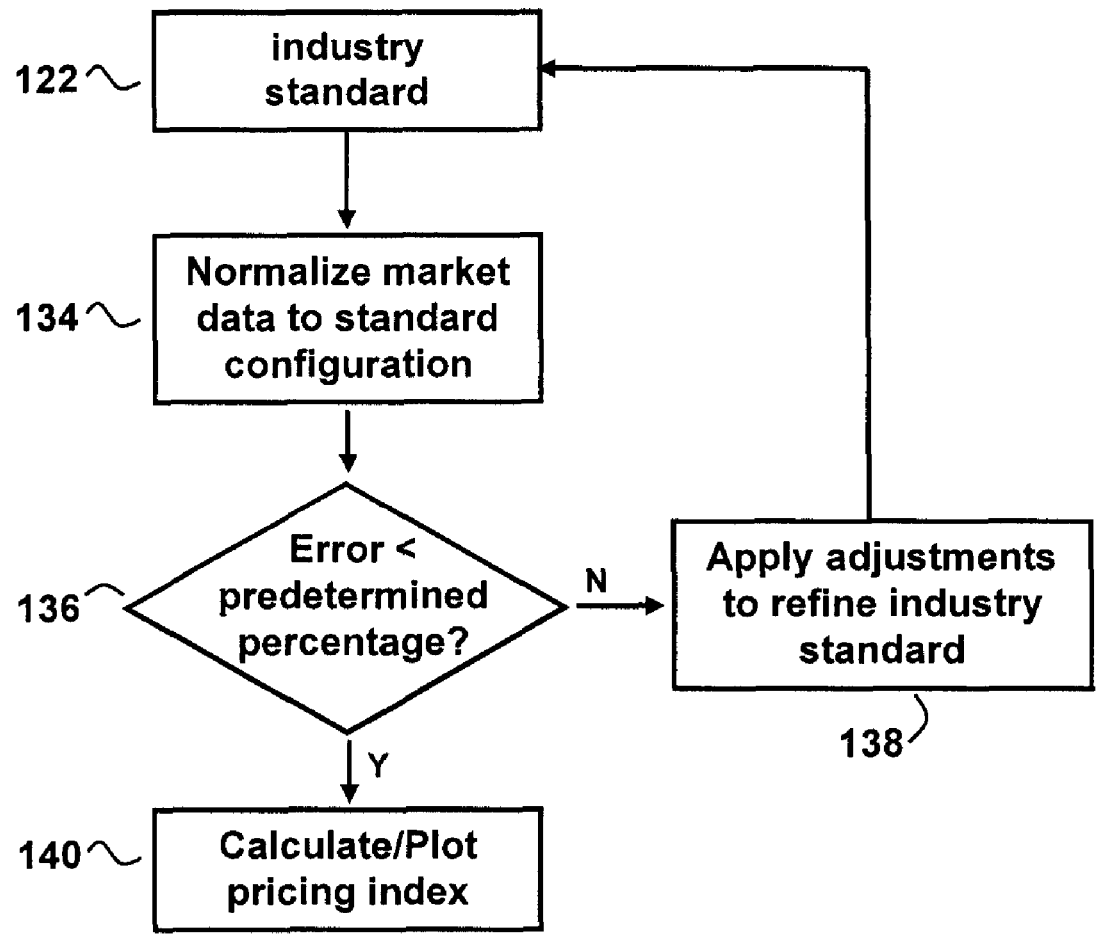

FIG. 1b illustrates the iterative normalization and adjustment process of steps 120, 130, and 140 according to some embodiments. In some cases, it may be desirable to set an "initial" industry standard at 122 to initialize the iterative process. Thereafter, each iteration results in a refined industry standard at step 122. In 134 and 138, the market raw data is iteratively normalized and adjusted, respectively, to obtain a final industry standard within a pre-determined error level from the previous iteration. According to embodiments, the market data sets in step 134 are normalized with respect to several service characteristics. In further embodiments, the adjustment percentages in step 138 are based upon the market data sets and/or from external data regarding e.g., known costing ratios. The process iteratively solves for the industry standard curve by normalizing, and re-normalizing, until the final curve is within e.g., 1% or less of the curve in the preceding iteration 136. When the iterative process is complete, the normalized market data points all reflect the same characteristics for the service. In step 140, a standard pricing index for that industry is created and/or plotted against which other similarly adjusted contracts may now be compared. In embodiments, the index may be plotted using an appropriate curve fit algorithm, mathematical power curve, trend function and/or forecasting function, and the like.

Returning to FIG. 1a, at step 150, a user enters a user-defined raw data set describing characteristics for a unique configuration of business services through a user interface (not shown). The user-defined raw data set characteristics may describe, for example: pricing, service volume, labor resources, hardware resources, type of service, third party services, quantity of service, quality of service, complexity of service, etc. In addition, the unique configuration of business services may describe an existing contract, a new contract, or a proposed contract. The data set characteristics are not particularly limited, and can be any characteristics that can be quantified, summarized, or otherwise described in a manner that allows for comparison to other characteristics of a similar nature. In preferred embodiments, the user-defined data set is input through the user interface in the form of answers to questions that may be subsequently quantified (e.g., using conventional techniques) to accurately represent the configuration of services, and stored in the one or more database.

In step 160, the user-defined raw data set is normalized with respect to the determined industry standard and adjusted. A contract price may be determined by combining characteristics from the normalized and adjusted user data set, normalized and adjusted market data, and/or external data (step 170). In embodiments where the user-defined characteristic data does not include a contract price, a corresponding contract price may be determined e.g., based on the industry pricing index. In embodiments where the user-defined characteristic data includes a proposed (or actual) contract price, the normalized and adjusted proposed price may be plotted and/or compared to the industry pricing index to determine differences in contract pricing. Preferably, the pricing index and the user-defined configuration of business services, as adjusted, represent the same standardized configuration of services. Consequently, the normalized and adjusted user contract price (for a corresponding volume) may be plotted along with the pricing index and a direct price comparison performed. In embodiments, the normalized and adjusted contract price may also be directly compared with other contract prices that have been similarly normalized and adjusted with respect to the same configuration of services. In further embodiments, direct, numerical, and/or statistical price comparisons may further be made. It should be noted that the presently disclosed system may be used to create an industry standard, where one does not exist. That is, where an industry standard for a particular service does not exist, one or more original data sets may be entered into the system to calculate a benchmark or baseline against which other data may be compared.

At step 180, the calculated and/or determined price results are processed by a report generator and output to a display (not shown). Preferably, the report generator creates a graphical indication of the results and provides supporting textual documentation, analysis, etc. For example, the report may display the results in context with other relevant business data. Alternatively, because the results have been standardized with respect to the industry standard, they may be displayed own their own without external contextual data. In embodiments, because the data sets are normalized and adjusted with respect to the same configuration of services, it is possible that reports for two or more different user-defined data sets may be directly compared—either with respect to the industry pricing index and/or to one another. It is to be noted that any useful output can be displayed in any useful format, including, but not limited to display on a computer terminal or other monitor, display on a printout from a printer, and output to a data file for storage on a computer-enabled media.

Figure 1C:
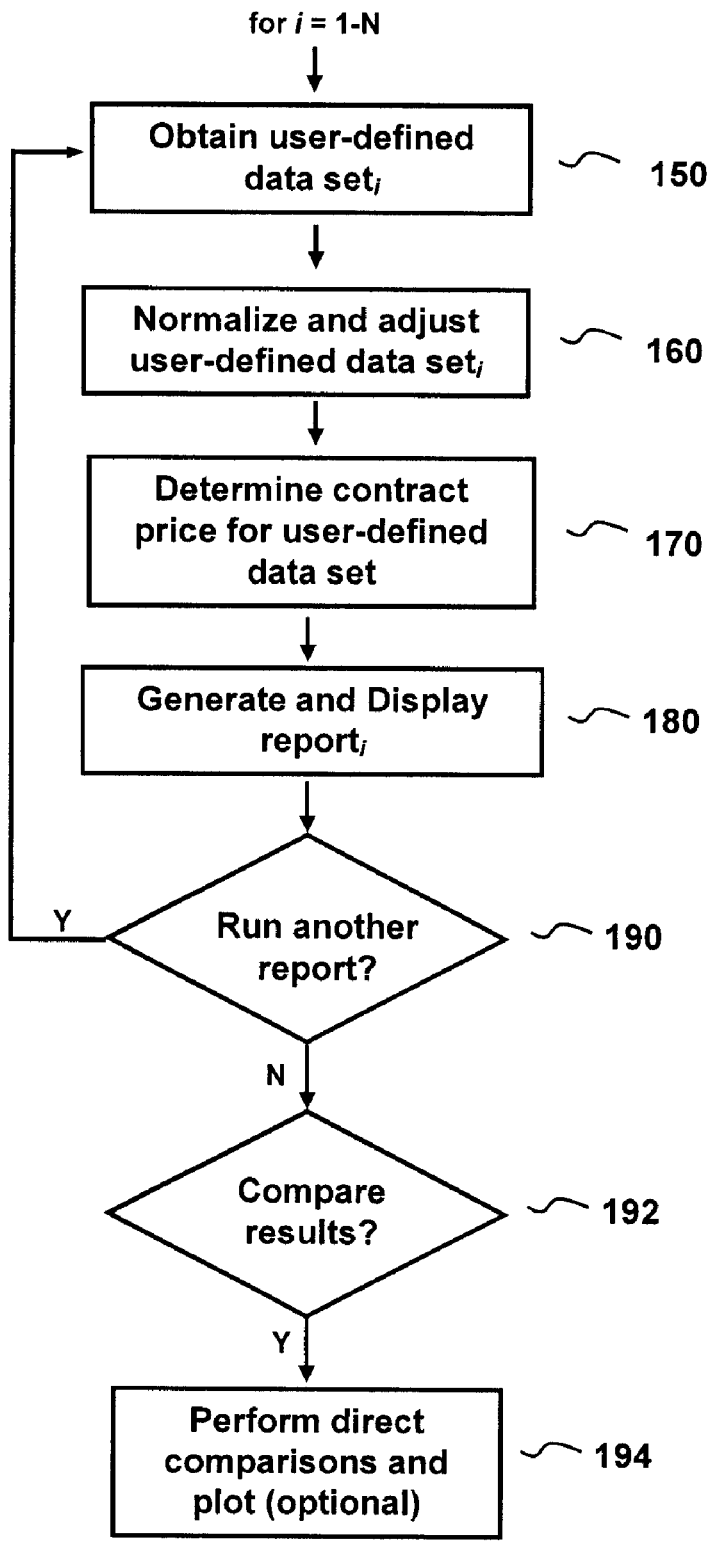

The process with respect to steps 150-180 may be repeated for different user-defined data sets (1-N) as shown generally in FIG. 1c. In this manner, data sets for different users may be obtained and compared and/or different data sets for the same user may be obtained and compared. Preferably, the two or more different data sets are compared directly and/or with respect to the industry pricing index. For example, a user may be provided with the option to run another report (step 190) by going back and changing the data input into the user interface (e.g., with respect to scope, quantity, etc.) to create another user-defined data seti. When the report(s) have been generated, the results may be optionally directly compared and/or plotted at 192 and 194, respectively. As a result of this direct comparison, it is possible that tradeoffs between scope, service levels, and/or price may be assessed in substantially real time.

In embodiments, the benchmarked results may further be used as inputs to make business case(s) for: outsourcing, using in-house resources, re-sourcing previously outsourced services, obtaining an independent third party assessment of an in-process outsourcing arrangement between two or more parties, and/or for other users where an understanding of market pricing, packaging, or configuration of the services is useful. In essence, the output can be used for any suitable decision-making process.

Figure 2A:
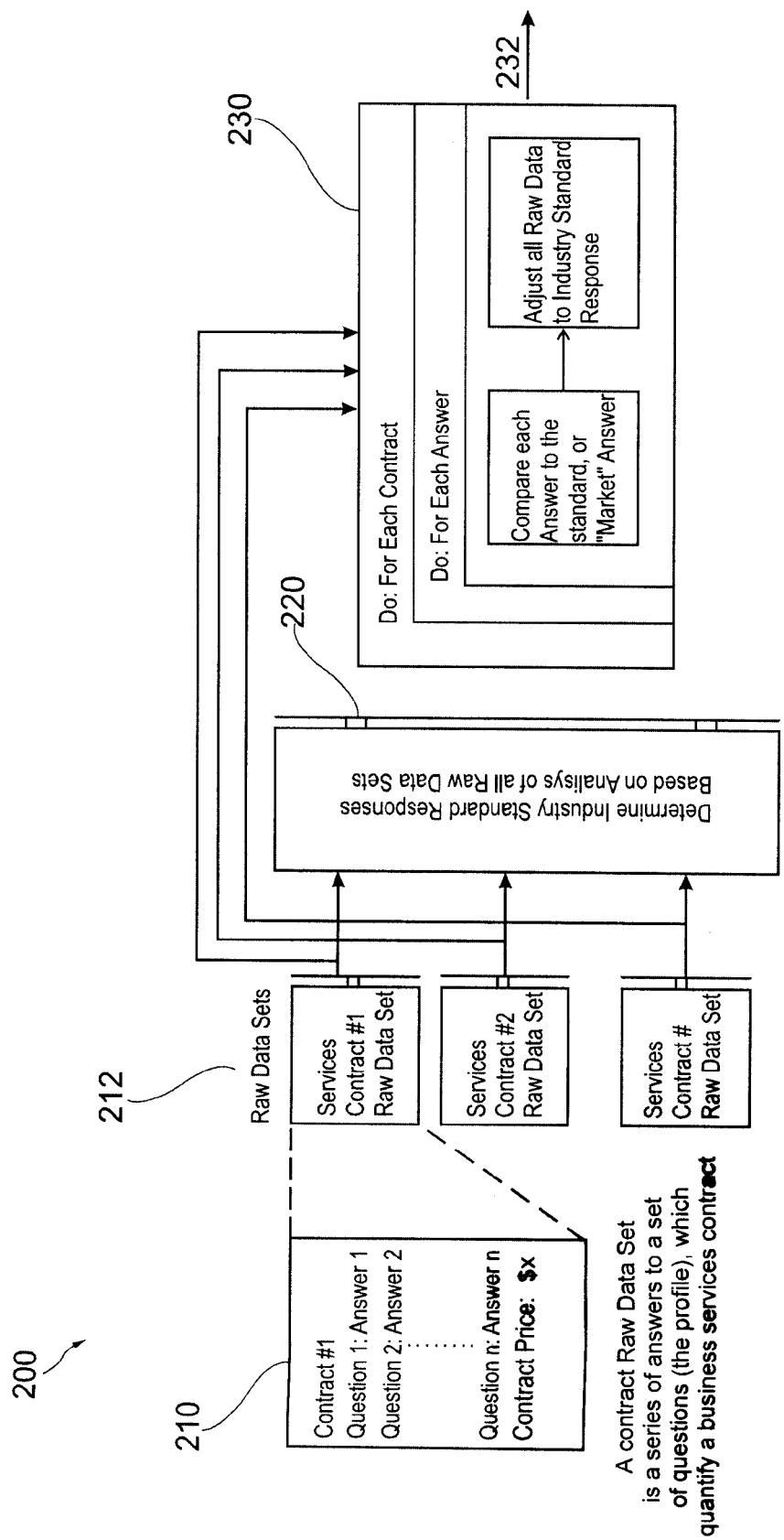
FIGS. 2 *a* and *b* illustrate a business service pricing and/or comparison flowchart according to an exemplary embodiment of the invention.
Figure 2B:
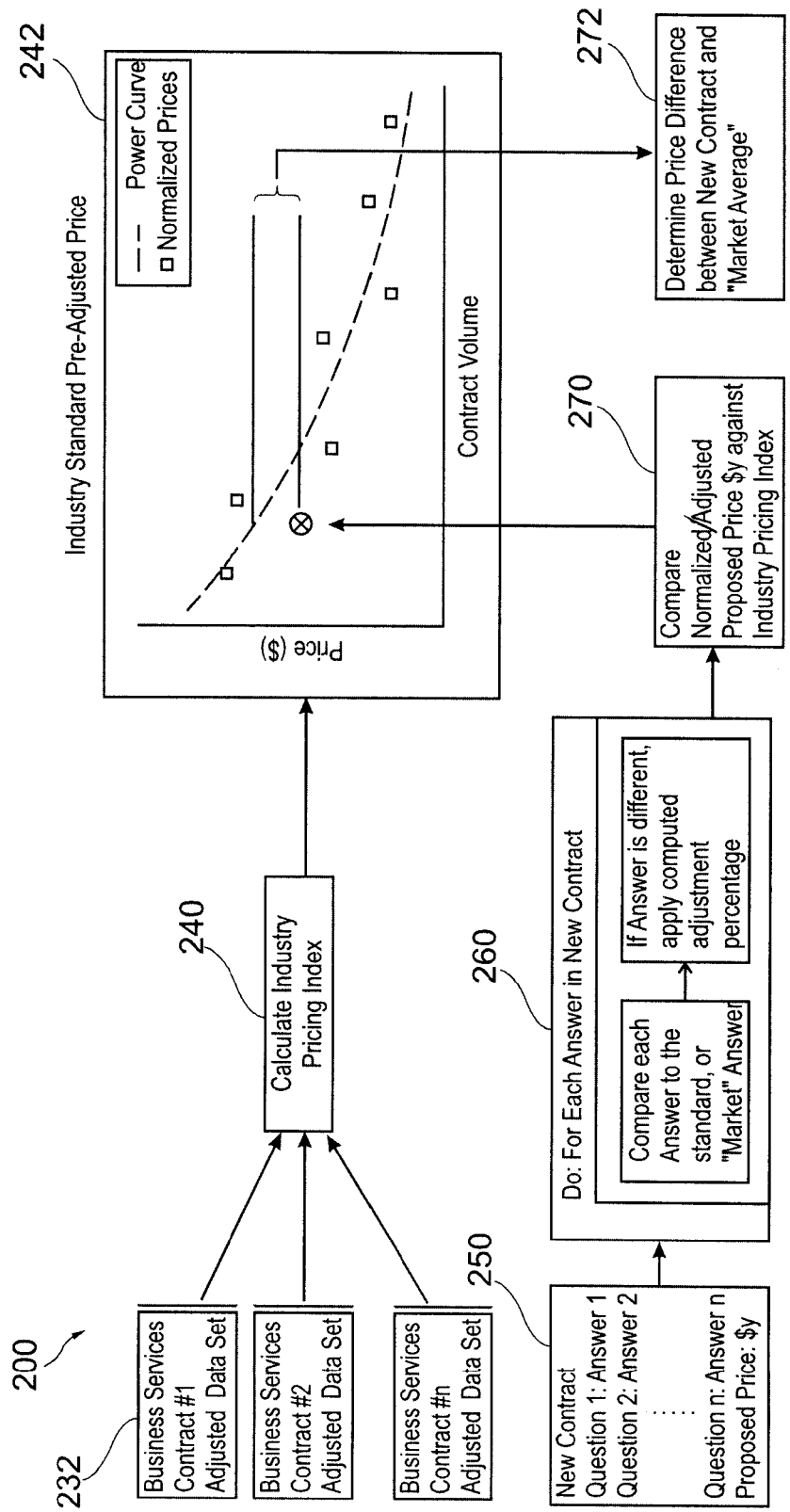

FIGS. 2a-b illustrate flowchart method steps, generally referenced as 200, according to another preferred embodiment, which may be implemented as part of a business services pricing model. In general, two sets of inputs are obtained. The first is a set of market raw data points, which comprise existing prices for a quantifiable set of business services, and the configuration of those specific services. The second input set is a configuration of inputs which a user enters e.g., through a user interface (not shown).

As shown in 210, market raw data sets 212 are obtained. Preferably, the number of raw data sets is large enough to ensure the accuracy of the benchmarking results for a variety of industries. Typically, such data sets 212 have been previously obtained, however it will be appreciated by those skilled in the art that receipt of and updating of market raw data sets may be a continual and ongoing process. For example, it is possible that the user-defined data sets may also be used to update the database of market data sets.

At 220 and 230, the raw data sets 212 are iteratively normalized and adjusted to determine an industry standard. In this particular embodiment, this process includes comparing each answer for each contract with respect to the corresponding determined industry standard answer. Upon completing steps 220 and 230, all of the market data sets have been normalized and adjusted to correspond to the determined market standard, resulting in normalized market data sets 232. The normalized market data sets are processed in 240 to compute an industry pricing index 242 against which other similarly adjusted contracts may now be compared. In embodiments, the index 242 may be plotted using an appropriate curve fit algorithm, mathematical power curve, trend function and/or forecasting function, etc. For example, a power curve (represented by a dashed line in the figure) may be computed as price (y-axis) with respect to volume (x-axis).

In this figure, the normalized market data sets 232 are also plotted on the graph and are represented by squares. Each square represents the price for each market data set (as normalized to a standard configuration of services) with respect to a corresponding contract volume. Although the pricing index is plotted here for convenience, it is understood that the data need not be graphically plotted to be compared and that other ways of computing and/or representing the data are possible.

It is further understood that steps 210, 212, 220, 230, 232, 240, and 242 are preferably performed prior to a user entering a user-defined configuration of business services to be benchmarked and/or priced. At step 250, a user provides answers to questions through a user interface (not shown) to characterize a user-defined configuration of business services. The characteristics for the user-defined configuration of business services may include an actual or proposed price, but not necessarily. In 260, the answers are quantified (e.g., using conventional techniques), normalized, and adjusted with respect to the industry standard determined in 220 and 230. In this particular embodiment, each answer is compared to the to the industry standard answer. If the answer is different, then a predetermined and/or computed adjustment percentage is applied to cause the contract answer to correspond to the market standard.

If an actual or proposed contract price is not provided in step 250, a corresponding contract price may be determined directly from the pricing index. If a proposed (or actual) price is provided in step 250, the normalized and adjusted proposed price is plotted and directly compared against the pricing index at 270 and a price difference between the normalized and adjusted proposed and a market average determined at 272. Because both the market raw data sets and the new contract data set have been adjusted with respect to the same industry standard, a direct comparison may be made between the plotted prices. Thus, in 272, a price difference is calculated by determining the y-axis difference between the adjusted proposed price and the market average reflected by the power curve, or industry pricing index. As a result, it may be determined, for example, that the adjusted proposed contract price is above the industry standard price, below the industry standard price, or approximately the same as the industry standard price for a corresponding volume.

System

Figure 3A:
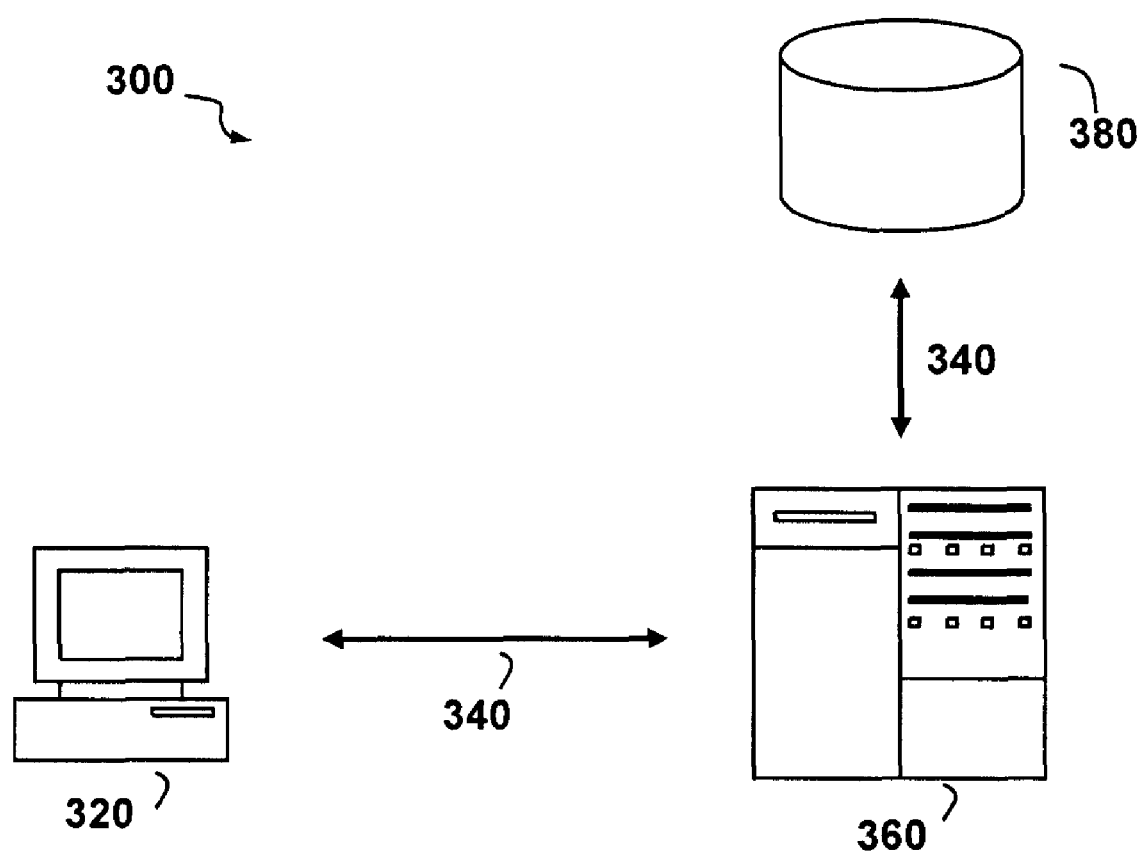
FIGS. 3 *a* and *b* illustrate a system according to an exemplary embodiment of the invention.

FIG. 3a illustrates a system 300 according to another aspect and includes at least one user computer 320 and a business service pricing module 360 in communication with one another over a communication network 340 such as the internet. However, it will further be appreciated that the network 340 may include any combination of LANs, WANs, etc. and be comprised of any combination of: wire, cable, fiber optic, mobile, cellular, satellite, and/or wireless networks. Preferably, the business service pricing module 360 is further in communication with at least one database 380 over a communication network 340, which may be the same or a different network than the network between 320 and 360.

The business pricing module 360 is typically operated by a benchmarking service provider and preferably resides on one or more: remote processors, servers, and/or mainframes accessible by a plurality of user computers 320. The business pricing module 360 may be comprised of any combination of hardware and/or software connected in any suitable manner for performing the disclosed embodiments. In addition, it is possible that portions of the business pricing module 360 may communicably reside on one or more processors in the same, or separate, locations. The one or more user computer 320 may include one or more PCs, laptops, handheld devices, workstations, and the like. The user computer 320 typically includes a display, keyboard, pointing device, one or more processors, internal memory (e.g., RAM, ROM, etc.), and storage media. Such storage media may include any fixed or removable devices such as hard drives, CDs, DVDs, magneto-optical storage, memory sticks, and the like.

The database(s) 380 may be configured to store raw market data sets, user-defined raw data sets, industry standards, pricing indices, questionnaires, answers to questionnaires, and other market or user-related information according to the principles disclosed herein. For example, external data may include known pricing drivers, costing ratios, and the like. In addition, the database may check for and correct invalid data which may be performed by applying filters to eliminate outliers or clearly erroneous data. However, it will be appreciated that other techniques for checking and correcting invalid data may also be applied. In embodiments, the database(s) 380 may be configured to receive and store instances of specific characteristics, and to define and maintain a list of the characteristics, as well as related algorithm variables and calculations. In embodiments, the database(s) may be configured to compile and analyze the market data sets to determine which configurations and characteristics are the most common, yielding a common market configuration.

In practice, the user computer 320 connects to the business service pricing module 360 over the network 340 (e.g., over the internet). Preferably, the user computer 320 is able to access the business pricing module 360 (e.g., residing on a server) over the internet using HTTP, FTP, SMTP, WAP protocols, or the like. In embodiments, the business pricing module 360 may be assigned one or more IP addresses that are mapped to a corresponding website or URL (which may be associated with a website of the benchmarking service provider). The user computer 320 is able to access the business pricing module 360 through a resident web browser which resolves the URL to a corresponding IP address to establish a connection over network 340.

Preferably, the user computer 320 may access a portal through the website that provides benchmarking and other business pricing services and resources to registered users. Upon a first visit to the website, users may be prompted to enter a username and password (or another secure form of authentication). Once registered, the user may visit the portal at any time and perform authentication to establish a secure connection using SSL or TLS, a virtual private network, or the like. In this way, the user-specified business service information entered through the user interface and the resulting generated reports may be kept confidential and secure. For additional security some, or all, of the user name, company name or any other identifying information may either be deleted or encrypted for storage in the database(s).

Figure 3B:
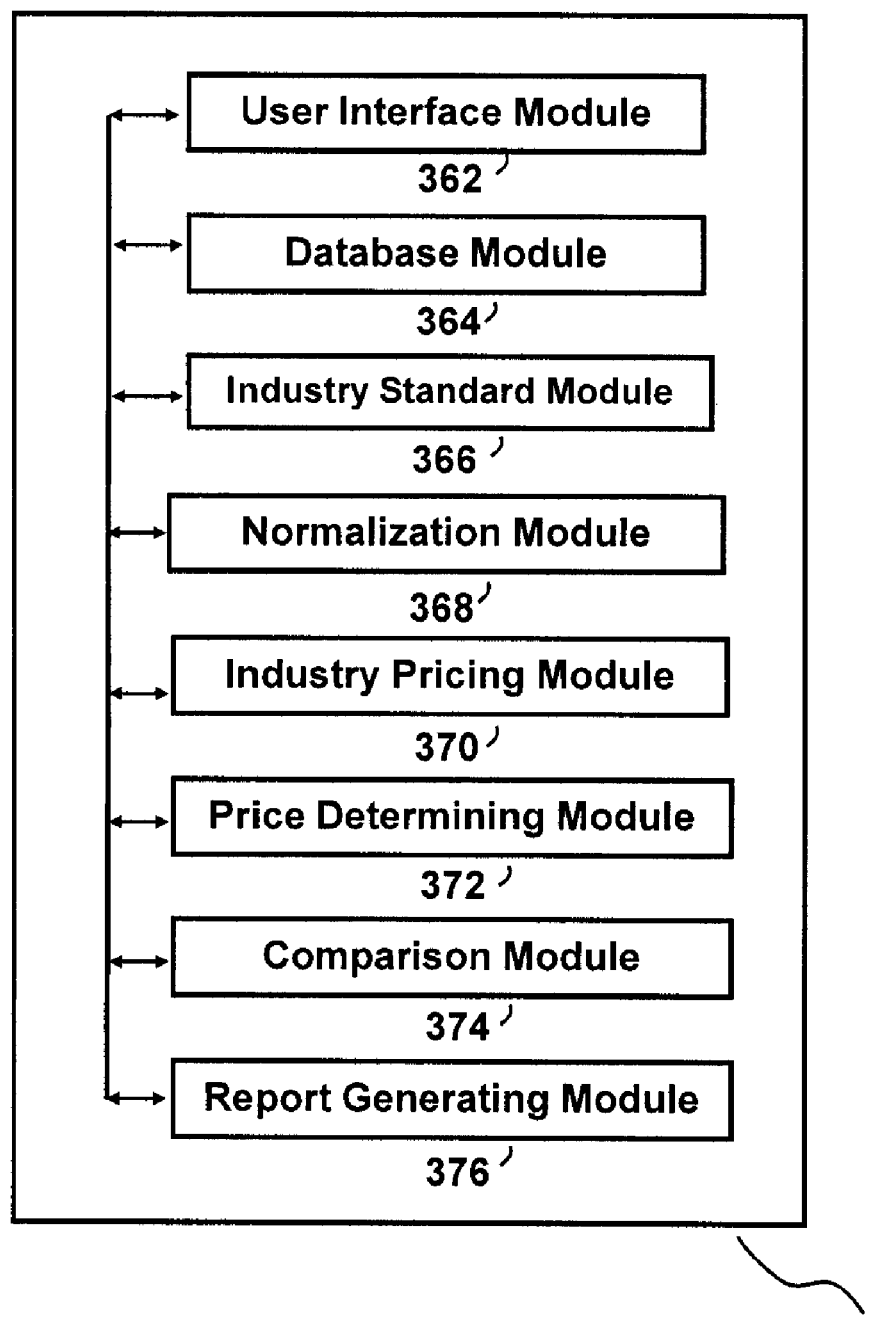

According to the exemplary embodiment shown in FIG. 3b, the business service pricing module 360 comprises: a user interface module 362, a database module 364, an industry standard module 366, a normalization module 368, an industry pricing module 370, a price determining module 372, a comparison module 374, and a report generating module 376. As will be appreciated by those skilled in the art, the above modules may be comprised partially or completely in software, hardware, and/or firmware. In addition, it is possible that other modules may be included to provide additional features depending upon various applications and configurations.

The user interface module 362 is configured to provide a set of input screens (see e.g., FIGS. 4a-b) in which the user enters answers to a set of questions. Preferably, the questions are designed to obtain a set of answers that describe the scope and scale of the user's particular situation, in the context of the business service(s) being evaluated and, in embodiments, allow the pricing module 360 to determine a market price estimate for the user's particular service configuration. The user interface module 362 may use commercially available software for creating interactive displays as will be appreciated by those skilled in the art. For example, the user interface may be configured to obtain user information such as name, company, etc. as well as business services information such as industry and other industry-related characteristic data. In embodiments, the user interface module 362 is configured to receive user-defined characteristic data that does not include a contract price. In embodiments, the user interface module 362 is configured to receive user-defined characteristic data that includes an actual or proposed contract price. Preferably, the user interface represents an interactive Web front-end to a business pricing module 360 that allows the user to run a benchmark report after entering the characteristic data. In embodiments, the user can go back and change the characteristic data and/or values and re-run the report. In further embodiments, the interactive user interface allows substantially real time changes to the input data and provides consistent benchmark results that can be directly compared. Consequently, the corresponding benchmark results may be used for "what-if" modeling and prediction and to provide support for various business decisions such as outsourcing, investing, etc. In addition, tradeoffs between scope, service levels and price may be readily assessed in substantially real time.

As will be appreciated by those skilled in the art, the database module 364 receives and stored data from the user-interface (as well as from other sources) and may be used to sort and filter obtained data according to various characteristics and/or groupings. The database module 364 may be configured to perform various functions calls, etc. to import and/or upload data from the one or more database(s) and provide the data to the other modules of the business pricing module 360.

In preferred embodiments, the industry standard module 366 is configured to derive industry standard values for characteristic market services using the raw market data sets. For example, the industry standard module 366 may access the raw data sets stored in the database according to a particular industry. In embodiments, the module is configured to iteratively analyze the raw data sets for each industry to determine an industry standard according to the above described techniques.

The normalization module 368 is configured to iteratively normalize and adjust the raw data sets with respect to the industry standard derived by module 366. In embodiments, the normalization module 368 is configured to perform normalizations for several service characteristics, which in some cases may be approximately 15 or more. Of course, fewer service characteristics may be used, where desired. In embodiments, the normalization module 368 is further configured to adjust the price of raw data sets for differences in services. Adjustments may be based on the derived industry pricing index and/or external calculations. Such external calculations may include, for example, independent curves based on cost ratios for a particular industry. Preferably, the calculations use standardized percentages where applicable. In further embodiments, the calculations use independent models to determine the nature, complexity, scale, scope, costs, and/or labor associated with the services differences being analyzed. The normalization module 368 may also be configured to normalize and adjust user-defined configurations of business services with respect to the industry pricing index and/or external calculations.

The industry pricing module 370 is configured to calculate an industry pricing index using the normalized market data sets from the normalization module 368. The normalized market data sets are processed to compute an industry pricing index (e.g., plotted as price versus contract volume) against which other similarly adjusted contracts may now be compared. In embodiments, the indexing module is configured to plot the industry pricing index 370 using e.g., an appropriate curve fit algorithm, mathematical power curve, trend function and/or forecasting function, etc.

The price determining module 372 is configured to calculate a contract price for the user-defined configuration of business services using the user-defined configuration of business services characteristic data and/or extrinsic market data. In embodiments, the price determining module 372 is configured to determine a contract price based on the industry pricing index. In embodiments, the price determining module 372 is further configured to sum adjusted characteristic pricing data from at least one of: the normalized user-defined data set, the normalized market data sets, and external data to determine a contract price.

The comparison module 374 is configured to compare a normalized and adjusted user-defined business service proposed contract price to the industry pricing index. The comparison module 374 is configured to compare and/or plot the normalized and adjusted proposed contract price against the industry pricing index to determine differences in contract pricing, volume, etc. Preferably, because the pricing index and the normalized user-defined configuration of business services now represent the same standardized configuration of services, the comparison module 374 is able to plot the normalized and adjusted proposed contract price (for a corresponding volume) along with the pricing index and make a direct price comparison. In embodiments, the comparison module 374 is configured to directly compare normalized and adjusted contract prices with other contract prices that have been similarly normalized and adjusted with respect to the same configuration of services. In embodiments, the comparison module 374 is configured to make direct, numerical and/or statistical pricing comparisons. Preferably, the comparison module 374 is configured to compare each characteristic data value in the user-defined configuration of business services to the industry standard data value for that characteristic, and if different, apply a predetermined adjustment calculation.

The report generating module 376 is configured to integrate the results of the price determination module 372 and/or comparison module 374 with other context-relevant data. For example, the report may display the results in context with other relevant business data. Alternatively, because the results have been standardized with respect to the industry standard, they may be displayed own their own without external contextual data. In embodiments, because the data sets are normalized with respect to the same configuration of services, it is possible that reports for two or more different user-defined data sets may be directly compared—either with respect to the industry pricing index and/or to one another. Such information may provide specific information for assisting in making decisions regarding outsourcing, using in-house resources, acquisitions, investments, etc. In embodiments, the reporting module may utilize a web page "template" to display graphical data, summary statistics and other supporting documentation. In embodiments, the report generating module 376 in conjunction with the user interface module 362 are configured to allow the user to go back and change previously input data and re-run the report. In this manner, the user may see how various inputs affect the determined contract price. Consequently, tradeoffs between scope, service levels, and price may be readily assessed in substantially real time.

In embodiments, the comparison module 374 and or report generating module 376 may be configured to use the benchmarked results as inputs to make business case(s) for: outsourcing, using in-house resources, re-sourcing previously outsourced services, obtaining an independent third party assessment of an in-process outsourcing arrangement between two or more parties, and/or for other users where an understanding of market pricing, packaging, or configuration of the services is useful.

The above modules may be implemented in the form of hardware and/or software instructions as will be appreciated by those skilled in the art. The modules may include custom macros, subroutines, logic, etc. implemented using commercially available software such as Microsoft Excel™, Microsoft Access™, MS SQL Server™, Visual Basic, C++, Java, .NET, C#, etc. In addition, it will be appreciated by those skilled in the art that the modules may be implemented in various configurations are not limited to the configurations disclosed herein, and that the modules may be combined in various manners to perform the functions disclosed herein. According to a further aspect, the software instructions may reside in whole, or in part, on a computer-readable medium.

EXAMPLE

Disaster Recovery Support Services

FIGS. 4*a* and *b* illustrate an exemplary questionnaire (shown generally at 400) for obtaining characteristic data for a user-defined configuration of business services. In this example, the configuration of business services describes mainframe disaster recovery support. The user interface presents a series of questions to a user and provides locations on the screen for the user to input information regarding a unique configuration of business services. As seen at the top of the interface, a section 410 is provided for obtaining user information such as user name, company, and run date. In section 420, a description of services may be entered. In this particular example, the services include: Security, Operations, and Technical Support, Basic DBA Support, Maintenance, etc. In addition, client objective information is additionally obtained (e.g., DR recovery objective Hot Site 48 hour recovery). In section 430, a description of service levels and performance is obtained such as mainframe availability service level agreement (SLA), availability window, response time SLA, etc. At 440 (depicted in FIG. 4*b*), descriptions of hardware requirements are obtained which describe, among other things, hardware resource characteristics, and the like. At 450, a description of performance baseline and prices are obtained such as quantity, MIPs, GB of online storage, etc. At 460, a description of workload complexity and location of services is obtained. At the bottom of FIG. 4*b*, a user-selectable button 470 is provided to run the report once the data has been entered.

While preferred embodiments have been discussed, it is understood that such configurations are exemplary only and it will be apparent to those skilled in the art that various modifications and variations can be made without departing from the scope or spirit of the invention. Therefore, the invention is not limited to the exact disclosed embodiments or examples, but rather all suitable modifications may be considered to fall within the scope of the invention and appended claims.

The invention claimed is:

1. A method for determining a contract price for a user-defined configuration of business services, said method comprising:
   obtaining a plurality of market raw data sets, the market raw data sets comprising data describing characteristics of business services including price of service and at least one of: type of service, scope of service, volume of service, quality of service, and other complexity or demographic data that drive price;
   deriving, by at least one processor, industry standard values for business services using the market raw data sets, the industry standard values being industry standard prices of business services;
   normalizing and adjusting, by the at least one processor, the market raw data sets with respect to the derived industry standard values by adjusting prices of the market raw data sets for differences in services based on the industry pricing index and standardized percentages based on industry-specific cost ratios;
   calculating, by the at least one processor, an industry pricing index using the normalized data sets;
   obtaining a characteristic data set for a user-defined configuration of business services;
   normalizing and adjusting, by the at least one processor, the user-defined characteristic data set with respect to corresponding derived industry standard values;
   determining, by the at least one processor, a contract price for the user-defined configuration of business services using at least one of: (i) the normalized and adjusted user-defined characteristic data set, and (ii) the normalized and adjusted market raw data sets; and
   generating one or more reports that graphically display the calculated industry pricing index or the determined contract price.

2. The method of claim 1, wherein calculating the industry pricing index includes plotting the normalized and adjusted market data sets and applying an appropriate curve fit algorithm to obtain an industry pricing curve.

3. The method of claim 1, wherein the derivation of the industry standard values, the normalization and adjustment of the market raw data sets, and the calculation of the industry pricing index are iteratively performed until the calculated pricing index remains within a pre-determined tolerance level with respect to previous iterations.

4. The method of claim 1, wherein obtaining characteristic data for a user-defined configuration of business services includes receiving answers from a user through a user-interface in response to predetermined questions presented on the user-interface, and translating the answers into quantified data that accurately characterize the user-defined configuration of business services.

5. The method of claim 1, further including obtaining characteristic data for two or more different user-defined configurations of business services, determining contract prices for the two or more different service configurations, and directly comparing the determined contract prices.

6. The method of claim 1, wherein obtaining the characteristic data set for the user-defined configuration of business services includes obtaining characteristic data that does not include a contract price, and determining the contract price includes determining a corresponding contract price based on the industry pricing index.

7. The method of claim 1, wherein obtaining the characteristic data set for the user-defined configuration of business services includes obtaining characteristic data that includes a proposed contract price, and determining the contract price includes directly comparing a normalized and adjusted proposed price to the industry pricing index thereby determining a price difference between the normalized and adjusted proposed price and a market average.

8. The method of claim 1, wherein obtaining characteristic data for a user-defined configuration of business services includes obtaining characteristic data of a unique configuration of service offerings.

9. The method of claim 1, further including obtaining characteristic market services data and/or characteristic user-defined business services data that are indicative of least one of: required labor resources, hardware resources, software resources, and third party services.

10. A system for determining a contract price for a user-defined configuration of business services, said system comprising:
   at least one processor, said processor configured to implement:
   a user interface module configured to obtain characteristic data sets for a user-defined configuration of business services;
   a database module configured to obtain and store a plurality of market raw data sets, the market raw data sets comprising data describing characteristics of business services including price of service and at least one of: type of service, scope of service, volume of service, quality of service, and other complexity or demographic data that drive price;
   an industry standard module configured to derive industry standard values for the business services using the market raw data sets, the industry standard values being industry standard prices of business services;
   a normalization module configured to normalize and adjust user-defined and market raw data sets with respect to the derived industry standard values;
   an industry pricing module configured to calculate a contract price for the user-defined configuration of business services using the normalized and adjusted market raw data sets; and
   a report generating module configured to generate one or more reports that graphically display the calculated contract price,
   wherein the at least one processor is further configured to:
   obtain a plurality of market raw data sets, the market raw data sets comprising data describing characteristics of business services including price of service and at least one of: type of service, scope of service, volume of service, quality of service, and other complexity or demographic data that drive price;
   derive industry standard values for business services using the market raw data sets, the industry standard values being industry standard prices of business services;
   normalize and adjust the market raw data sets with respect to the derived industry standard values by adjusting prices of the market raw data sets for differences in services based on the industry pricing index and standardized percentages based on industry-specific cost ratios;
   calculate an industry pricing index using the normalized data sets;
   obtain a characteristic data set for a user-defined configuration of business services;
   normalize and adjust the user-defined characteristic data set with respect to corresponding derived industry standard values;
   determine a contract price for the user-defined configuration of business services using at least one of: (i) the normalized and adjusted user-defined characteristic data set, and (ii) the normalized and adjusted market raw data sets; and generate one or more reports that graphically display the calculated industry pricing index or the determined contract price.

11. The system of claim 10, wherein the industry pricing module is further configured to plot the normalized and adjusted market raw data sets and apply an appropriate curve fit algorithm to obtain an industry pricing curve.

12. The system of claim 11, wherein the industry standard module, normalization module, and industry pricing module are configured to iteratively calculate the industry pricing curve until the calculated industry pricing curve remains within a predetermined tolerance level with respect to previous iterations.

13. The system of claim 11, wherein the user interface module is configured to receive characteristic data that includes a proposed contract price, the normalization module is configured to normalize and adjust the proposed price, and the processor system further includes a comparison module configured to directly compare the normalized and adjusted proposed price to the industry pricing curve, thereby determining a price difference between the adjusted proposed price and a market average.

14. The system of claim 10, wherein the user interface module is further configured to receive answers from a user in response to predetermined questions presented on the user interface module, and to translate the answers into quantified data that accurately characterize the user-defined configuration of business services.

15. The system of claim 10, wherein the user interface module is configured to receive characteristic data that does not include a contract price, and the industry pricing module is configured to determine a corresponding contract price.

16. The system of claim 10, wherein the user interface module is further configured to obtain characteristic data for two or more different user-defined configurations of business services, the industry pricing module is further configured to determine contract prices for the two or more different configuration of business services, and the processing system further includes a comparison module configured to directly compare the determined contract prices for the two or more different user-defined configuration of business services.

17. The system of claim 10, wherein the user interface module or the database module are further configured to obtain characteristic market services data and characteristic user-defined business services data that are indicative of least one of: required labor resources, hardware resources, software resources, and third party services.

18. A non-transitory computer readable medium containing computer readable instructions for determining a contract price for a user-defined configuration of business services, the instructions including:

obtaining a plurality of market raw data sets, the market raw data sets comprising data describing characteristics of business services including price of service and at least one of:—type of service, scope of service, volume of service, quality of service, and other complexity or demographic data that drive price;

deriving industry standard values for business services using the market raw data sets, the industry standard values being industry standard prices of business services;

normalizing and adjusting the market raw data sets with respect to the derived industry standard values by adjusting prices of the market raw data sets for differences in services based on the industry pricing index and standardized percentages based on industry-specific cost ratios;

calculating an industry pricing index using the normalized data sets;

obtaining a characteristic data set for a user-defined configuration of business services;

normalizing and adjusting the user-defined characteristic data set with respect to corresponding derived industry standard values;

determining a contract price for the user-defined configuration of business services using at least one of: (i) the normalized and adjusted user-defined characteristic data set, and (ii) the normalized and adjusted market raw data sets; and generating one or more reports that graphically display the calculated industry pricing index or the determined contract price.

19. The computer program product of claim 18, wherein the instructions for obtaining a characteristic data set for a user-defined configuration of business services further include instructions for obtaining characteristic data that does not include a contract price, and the instructions for determining a contract price further include instructions for determining a corresponding contract price based on the industry pricing index.

20. The computer program product of claim 18, wherein the instructions for obtaining a characteristic data set for a user-defined configuration of business services further include instructions for obtaining a proposed contract price, and the instructions for determining a contract price further include directly comparing a normalized and adjusted proposed contract price to the industry pricing index, thereby determining a price difference between the normalized and adjusted proposed price and a market average.

21. The computer program product of claim 18, wherein the instructions for deriving industry standard values, normalizing and adjusting the market raw data sets, and calculating an industry pricing index are iteratively performed until the industry pricing index remains within a pre-determined tolerance level with respect to previous iterations.

* * * * *